United States Patent
Abramson (10) Patent No.: US 10,567,436 B2
(45) Date of Patent: Feb. 18, 2020

(54) RECORDING REMOTE ACCESS ACTIONS IN VIDEO FILES

(71) Applicant: HONEYWELL INTERNATIONAL INC., Morris Plains, NJ (US)

(72) Inventor: Eli Abramson, Ramat-Gan (IL)

(73) Assignee: Honeywell International Inc., Morris Plains, NJ (US)

(*) Notice: Subject to any disclaimer, the term of this patent is extended or adjusted under 35 U.S.C. 154(b) by 137 days.

(21) Appl. No.: 15/954,312

(22) Filed: Apr. 16, 2018

(65) Prior Publication Data
US 2019/0319984 A1   Oct. 17, 2019

(51) Int. Cl.
| | |
|---|---|
| H04L 29/06 | (2006.01) |
| H04L 29/08 | (2006.01) |
| H04L 12/26 | (2006.01) |
| H04N 5/76 | (2006.01) |

(52) U.S. Cl.
CPC .......... *H04L 63/20* (2013.01); *H04L 63/1425* (2013.01); *H04N 5/76* (2013.01); *H04L 63/0272* (2013.01)

(58) Field of Classification Search
CPC .. H04L 63/20; H04L 63/1425; H04L 63/0272
USPC .......................................................... 726/23
See application file for complete search history.

(56) References Cited

U.S. PATENT DOCUMENTS

| | | | |
|---|---|---|---|
| 7,376,538 B1 | 5/2008 | Eatough | |
| 7,409,318 B2 | 8/2008 | Dulberg et al. | |
| 8,566,608 B2 | 10/2013 | Pemmaraju | |
| 2001/0029439 A1* | 10/2001 | Crain | G06Q 10/109 702/187 |
| 2004/0054770 A1 | 3/2004 | Touboul | |
| 2005/0147384 A1* | 7/2005 | Sakurai | G11B 19/025 386/230 |
| 2008/0114858 A1* | 5/2008 | Singh | H04L 63/1408 709/218 |
| 2008/0114883 A1* | 5/2008 | Singh | H04L 67/1008 709/228 |
| 2008/0114885 A1* | 5/2008 | Kulkarni | G06Q 40/00 709/229 |
| 2008/0114886 A1* | 5/2008 | Kulkarni | H04L 63/083 709/229 |
| 2008/0114888 A1* | 5/2008 | Bhatt | H04L 63/1416 709/231 |
| 2008/0115213 A1* | 5/2008 | Bhatt | G06F 21/316 726/22 |

(Continued)

*Primary Examiner* — Haresh N Patel (57) ABSTRACT

A method of remote access action includes directing user actions including a first action to a destination device in an industrial control system (ICS) through a terminal server including a memory, a remote access recording component (RARC), and a security center coupled by a communication server through a network connection to the ICS. The terminal server is coupled to a streaming server having a recorded session repository database. The terminal server limits the user to specifically allowed actions and directs actions if allowed enabling user selecting the destination device from a menu that then provides a connection for the first action to be begun. The RARC during the remote session records streams of video of display window content and text representing the first action, combines the text and display window content to generate a combined video output file and stores the file in the session repository database.

18 Claims, 5 Drawing Sheets

(56) References Cited

U.S. PATENT DOCUMENTS

| | | | |
|---|---|---|---|
| 2009/0129379 A1* | 5/2009 | Dibiaso | H04L 63/1425 370/389 |
| 2009/0129400 A1* | 5/2009 | Dibiaso | H04L 63/0245 370/412 |
| 2010/0325258 A1 | 12/2010 | Carpenter et al. | |
| 2012/0131461 A1* | 5/2012 | Raymond | G11B 27/10 715/723 |
| 2012/0304130 A1 | 11/2012 | Rueff et al. | |
| 2013/0185353 A1* | 7/2013 | Rondao Alface | H04N 5/445 709/203 |
| 2014/0259079 A1* | 9/2014 | Hall | H04N 21/47217 725/68 |
| 2015/0095855 A1* | 4/2015 | Bai | G06F 3/017 715/863 |
| 2016/0065880 A1* | 3/2016 | Pearson | H04N 5/45 348/14.07 |
| 2017/0220012 A1 | 8/2017 | Hart et al. | |
| 2018/0358008 A1* | 12/2018 | Johnson, Jr. | G10L 15/22 |
| 2019/0319984 A1* | 10/2019 | Abramson | H04L 63/20 |

\* cited by examiner

RECORDING REMOTE ACCESS ACTIONS IN VIDEO FILES

FIELD

Disclosed embodiments relate to Industrial Control Systems, more specifically to security management for industrial cyber-security for remotely accessed Industrial Control Systems.

BACKGROUND

Industrial plants and important infrastructure sites are common across industries such as oil, gas, mining, chemicals, energy, manufacturing and defense. Such plants may be defined by the well-known Purdue model where levels 0-3 in the Purdue model comprise the industrial control system (ICS), with level 0 being the field level with field devices (sensors and actuators) and processing equipment, which utilize an industrial network for its communications, and Level 4 and above (e.g., level 5). Level 4 and above are considered the "enterprise" level(s), such as for production scheduling. The ICS can comprise a distributed control system (DCS) or a supervisory control and data acquisition (SCADA) system.

There has been a move for allowing remote access to devices in the ICS, such as for allowing authorized contactors including vendors, including using the Industrial Internet of Things (IIoT). The advantage of IIoT or other remote access mechanisms is that factories and other industrial enterprises are becoming smarter, with more agile and more efficient operations and businesses. For example, remote access enables vendors to access the equipment they supply to their industrial customers for routine maintenance activities, such as patching, hardening and log collection, as well as rapid responses to certain incidents, including to perform investigations into a sudden drop in production, or a potential cyber-security breach. The downside is that connected industrial operations expose the ICS of factories and manufacturing facilities to external cyber-security risks.

Engineers and contractors can remotely access equipment within one or more of a customer's ICS using commercially available remote equipment access platforms, such as a Nextnine Ltd. (now part of Honeywell International Inc.) platform known as an 'ICS SHIELD' that is a security management solution for securing one or more ICS. The ICS SHIELD also protects ICS from cyber-security attacks, and enables remote monitoring and process control of its devices such as process controllers, field devices, and processing equipment. Engineers and other authorized individuals using the ICS shield may use a Nextnine' remote access protocol recording solution known as Session Recording for connecting through a designated remote server to generally perform any action that can be performed from within the ICS. ICS SHIELD sessions which were previously designated to be recorded within the ICS SHIELD software are recorded, thus capturing and storing display window content during remote access sessions, which enables plant auditors to play back the display window content in a video format, including the ability to stream the video in real-time so that an auditor can view the actions taken on his or her plants while the engineer was working.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize although some remote equipment access platforms provide a recording solution that records the display window content for authorized user remote access sessions to enable later auditing, there remains a problem when the engineer or other individual was connected to the remote server for a long time (e.g. several hours) session. For lengthy sessions it will generally take an extended period of time (almost the time of the entire session) for an auditor to review the entire remote session to enable finding specific transaction(s) of interest that occurred during the session, such as commands entered generally by typing in by the engineer.

Without disclosed recording of remote access user actions in video files, for an auditor to find a specific user command of interest, they must watch a video recording of the session from the start of the session until the command is found by viewing the display window that is provided, such as for say 2 hours in a 3 hour session. This is because the auditor is required to potentially go over the entire video recording until a malicious or other activity of interest is seen. Moreover, the auditor is limited to the actions seen on the screen, which cannot audit for example when a user opens a terminal application, moves its window outside of the view, but is still be able to type in commands which will not be visible on the screen, and thus will be absent from the video recording to enable its auditing.

This Disclosure provides a solution that solves this remote access auditing problem by combining two previously separate methods of remote access plant auditing comprising video recording of the display window content as well as logging of the user' actions (e.g., keystrokes or voice commands). The video recording and text representing the user's actions are provided together into a disclosed combined video comprising output file that contains both video of the display window content and the text representing the user's actions.

BRIEF DESCRIPTION OF THE DRAWINGS

FIGS. 3A-3C are screen capture snapshots of frames from an example sample combined video file comprising output video of malicious actions performed by an engineer on processing equipment in an ICS shown as a boiler controller associated with a steam boiler, having injected text as captions in the frames portraying commands that were typed in.

DETAILED DESCRIPTION

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

As used herein an industrial process facility runs an industrial process involving a tangible material that disclosed embodiments apply. For example, oil and gas, chemical, beverage, pharmaceutical, pulp and paper manufacturing, petroleum processes, electrical, and water. An industrial process facility that includes an ICS is distinct from a data processing system that only performs data manipulations.

Figure 1:
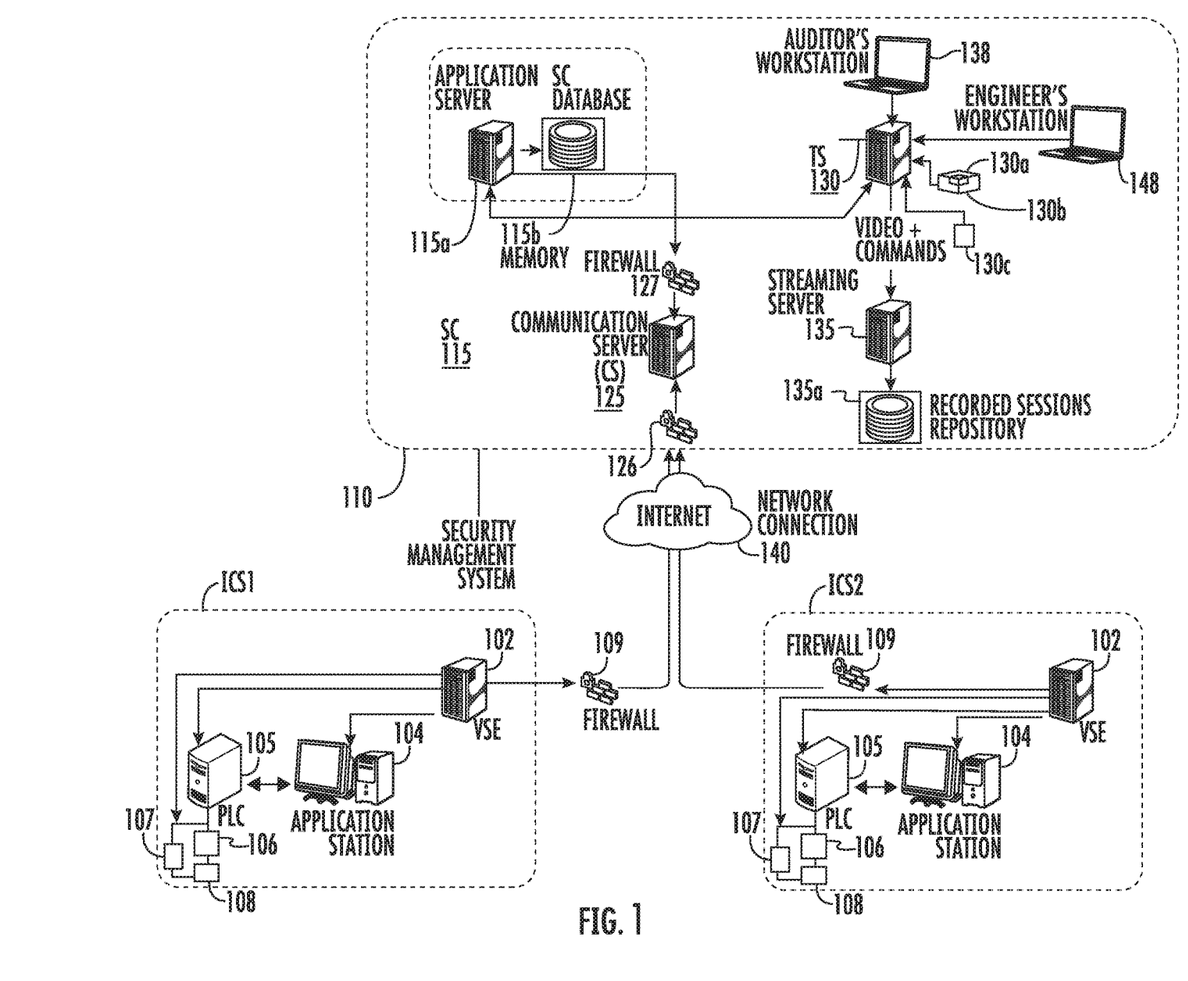
FIG. 1 shows a service network configuration including an example centralized security management system comprising a security center, and a terminal server that implements disclosed remote user access action recording in a video file connected to ICS through a communication server and a network connection, according to an example embodiment. The centralized security management system receives and consolidates events from all assets in multiple ICS sites, thus centralizing operations for a customer.

FIG. 1 shows a service network configuration including an example centralized security management system 110 comprising a security center (SC) 115, a terminal server (TS) 130 that implements remote user access action recording in a video file that is shown connected ICS1 and ICS2 through a communication server (CS) 125 and a network connection 140, according to an example embodiment. The SC 115 is shown comprising an application server 115a and a SC database in a memory 115b. The SC 115 is coupled to the CS 125 by a firewall 127. ICS1 and ICS2 can be in different locations, including different countries or different continents, and the centralized security management system 110 can receive and consolidate events from all assets located in multiple sites in different locations, thus centralizing security management operations for a customer.

The security management system 110 including the SC 115, its coupled SC database in memory 115b, the communication server (CS) 125, streaming server 135, TS 130, and recorded sessions repository 135a can be physically located at a company's headquarters, which is generally at the enterprise level(s) of the plant. Alternatively, most or all the security management system 110 components can be cloud-located at a dedicated virtual machine provider. The ICS1 and ICS2 each include a Virtual Security Engine (VSE) 102 comprising computers shown installed in ICS1 and in ICS2 that communicate through a firewall 109 over the network connection 140, which itself communicates through a firewall 126 to the CS 125. A workstation 138 shown as an auditor's workstation is shown coupled to the TS 130 for enabling the providing of an auditing or supervisory function to enable viewing the recording or the live video stream of the session.

The VSE 102 is an enabler of the remote access itself, where an engineer (or other individual) indirectly connects to the VSE 102 through the security management system 110, which in turn redirects the connection to the desired device in the ICS. The VSE 102 does not have any special role in the disclosed recording process. The VSE 102 in the respective ICS are shown coupled to an application station 104 that is coupled to a process controller shown as a programmable logic controller (PLC) 105. The PLC 105 is coupled to control field devices such as the sensor 106 and actuator 107 shown that are coupled to processing equipment shown as 108.

The SC database in memory 115b enables security personnel to centrally define their security policies, and distribute and deploy them to the VSEs 102 at the remote sites, together with rules for monitoring and reporting. The VSEs 102 connect to the various assets in the ICS, monitoring and enforcing its cyber-security.

The TS 130 implements remote access user action recording of actions by authorized users, such as contractors and engineers allowed by the customer to perform work at their sites, as captions in a video file to provide a disclosed combined video comprising output file. The process of injecting captions or subtitles into video files is known, and is widely used in the cinema and TV industries. The video portion comprises whatever the user had seen within the display window of a monitor of a workstation 148 of user's remote access connection shown in FIG. 1 as an engineer's workstation through the TS 130 to access a device in the ICS1 or ICS2 through the network connection 140. Although the network connection 140 is shown in FIG. 1 as an Internet connection, such as implementing IIOT, the network connection 140 can also be a wired connection, such as an Ethernet connection configured as a virtual private network (VPN), or wide area network (WAN). The user's actions can be a variety of actions, for example changing sensor settings, setting some threshold value to a different number; or changing some login permission.

The actions of the user can be entered by the user typing on a keyboard of the workstation 148 coupled to the TS 130. For disclosed recording to generally be possible, the session is conducted through the TS 130. The customer may choose not to use a TS 130, and still have ordinary remote access, but will not have any recording capability including command recording. The action of the user may also be a voice command that is processed with voice (or speech) recognition that enables the recognition and translation of spoken language into text by computers. The voice recognition can comprise a computer program or a hardware device that enables the decoding of the human voice. TS 130 thus acts as a recording device for user actions applied to a device in the ICS such as PLC 105, sensor 106, actuator 107, or processing equipment 108, through the SC 115.

The TS 130 limits and direct the users to specific allowed actions. For example, the SC 115 can be accessed from the workstation 148 as a SC website, which can be the portal through which the users select their destination device in an ICS through connecting to TS 130, inside of which the only available function can be to open a browser to the SC 115. The TS 130 has a memory 130a and remote access recording component (RARC) comprising RARC firmware 130b or RARC logic gates 130c.

As known in the art, algorithms such as for generating disclosed single video files containing both video and user actions algorithms may be implemented by hardware or can be implemented by software. Regarding hardware-based implementations, algorithm equations can be converted into a digital logic gate pattern, such as using a Very High Speed Integrated Circuits (VHSIC) Hardware Description Language (VHDL) that can then be realized using a programmable device such as a field-programmable gate array (FPGA) or a dedicated application-specific integrated circuit (ASIC) to implement the needed logic gate pattern shown as hardware including digital logic. Only one of the RARC firmware 130b and RARC logic gates 130c shown in FIG. 1 is needed.

The RARC component is for capturing streams of video of the user's screen actions as well as keystrokes or voice commands through voice recognition. The RARC component combines the user' actions such as keystrokes as text in captions in the streams of video to generate a single combined video comprising output file. There is generally a combined video comprising a frame every sampling/recording interval, from the time of the remote connection to through the full user action duration. The combined video comprising output files include the user commands such as keystrokes with the video at a same moment in video time as they were commanded by the user. The combined video comprising output files are stored in a recorded sessions repository database 135a of a memory of the database streaming server 135.

In the case of keylogging, keystroke logging, generally referred to as keylogging or keyboard capturing, is the action of recording (logging) the keys struck on a keyboard. Data can then be retrieved by the person operating the logging program.

The keyboard device driver interprets a scan code and translates it to a virtual-key code, a device-independent value defined by the system that identifies the purpose of a key. After translating a scan code, the keyboard device driver creates a message that includes the scan code, the virtual-key code, and other information about the keystroke, and then places the message in the system message queue. The system removes the message from the system message queue and posts it to the message queue of the appropriate thread of the application. Later, the thread's message loop removes the message and passes it to the appropriate window procedure of the application for processing.

Figure 2:
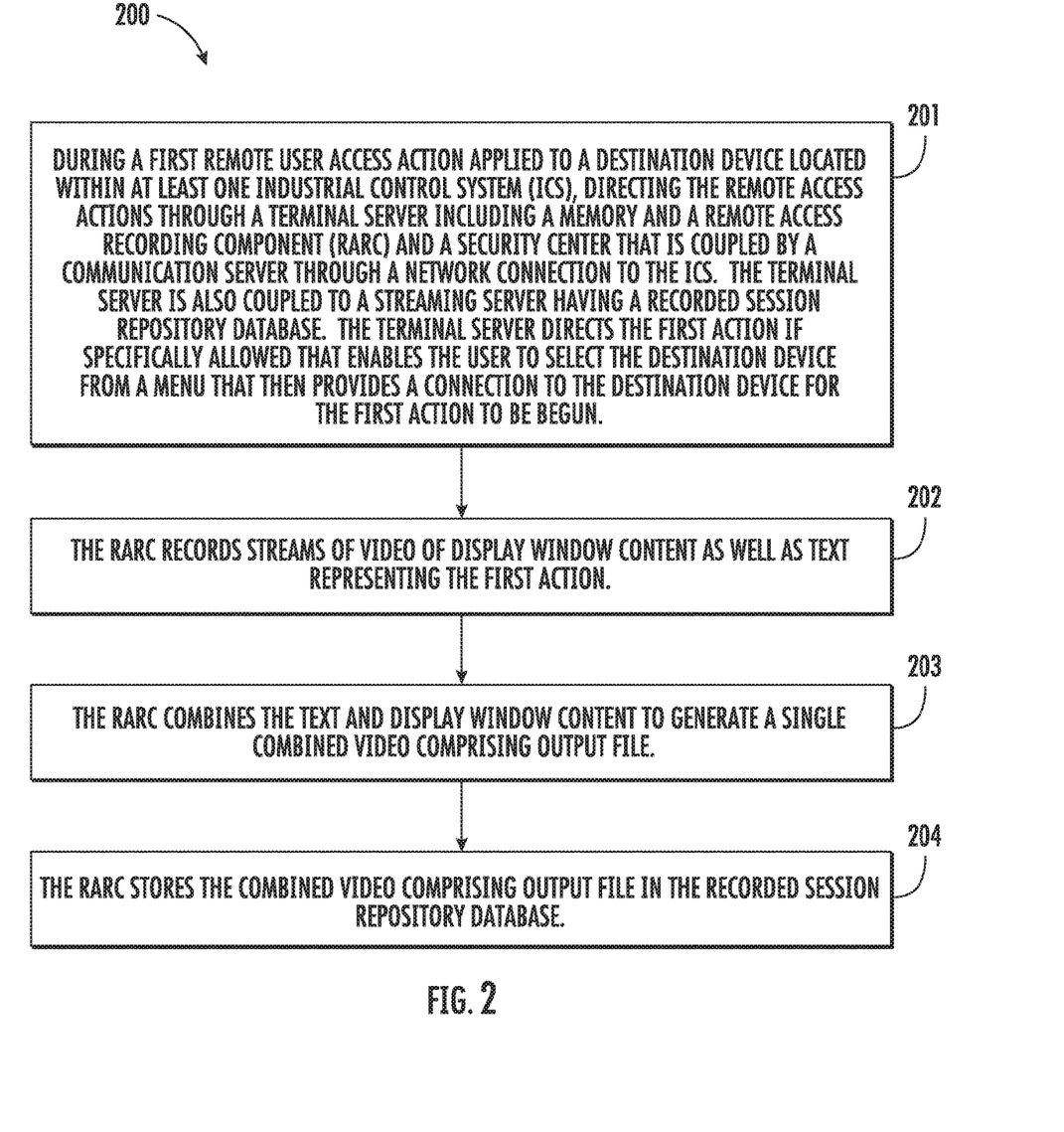
FIG. 2 is a flow chart that shows steps in a method of remote user access action recording in a video file, according to an example embodiment.

FIG. 2 is a flow chart that shows steps in a method 200 of remote user access action recording in a video file of a remote session, according to an example embodiment. Step 201 comprises during the remote session directing the remote access actions of a user including a first action to be applied to a destination device located within at least one ICS through a TS 130 including a memory 130a and a RARC and a security center 115 that is coupled by a communication server 125 through a network connection 140 to the ICS. The RARC 130b can comprise firmware in the memory 130a. The TS 130 is also coupled to a streaming server 135 having a recorded sessions repository database 135a. The TS 130 limits the user to only specifically allowed remote access actions and directs the first action if specifically allowed that enables the user to select the destination device in the ICS from a menu that then provides a connection to the destination device for the first action to be begun.

The user generally comprises a contractor or engineer allowed by a manager of the ICS to perform remote work at the ICS. The destination device can comprise a process controller, field device, or processing equipment, and the first action can comprise changing a setting of the process controller, field device, or changing a threshold value or a login permission.

The RARC 130b during each sampling interval of the remote session implements steps 202-204. Step 202 comprises recording streams of video of display window content as well as text representing the first action. As described above, the remote access actions can comprise keystrokes or voice commands by the user entered on a workstation computer coupled to the TS 130.

Step 203 comprises combining the text and display window content to generate a single combined video comprising output file. The text of remote access actions can be added as a caption in the display window content. Step 204 comprises storing the combined video comprising output file in the recorded session repository database.

The method can further comprise an auditor connected to the SC 115 for auditing at least one remote session comprising streaming the combined video comprising output files stored in the recorded sessions repository database 135a to identify a malicious activity. The session recordings in the recorded sessions repository database 135a are accessed via the SC 115. The sessions repository database 135a is generally transparent to users of the security management system 110, as they only generally 'see' the SC. Although the workstation 138 in FIG. 1 is shown coupled through the TS 130 to SC 115, there can also be a direct auditor connection to the SC 115.

An auditor utilizing a disclosed combined video comprising output file can now find a specific command of interest using at least two different audit options. A first audit option comprises viewing/downloading the recorded combined video comprising output file and following the user's (e.g., engineer's) actions along the way, seeing the keystrokes or other commands as captions similar to subtitle/caption dubbing for a foreign language film. A second audit option can use an ICS SHIELD web portal to search the database for the specified remote access session, including searching by a particular term, command, or part of command. In addition, the auditor can receive a textual list of the user' commands made during the session in a single file/document, allowing for a rapid overview of the user's actions regardless of the length of the session or idle times in the session.

EXAMPLES

Disclosed embodiments are further illustrated by the following specific Examples, which should not be construed as limiting the scope or content of this Disclosure in any way.

A customer allowed certain authorized contractors and engineers to access the SC 115 through a TS 130 on which disclosed firmware 130b for a disclosed RARC was installed. As described above, the firmware 130b captures and streams a video of the contractor's engineer's remote actions, and the firmware 130b also includes code for recording all of the engineer's keystrokes and streaming them along the video as an additional caption (or subtitle track). The streaming server 135 received the additional text data and combined it with the video data, and the output file contained frames including text representing the keystrokes at the exact moment in time (video time) that they were pressed. In addition, the keystrokes were saved in the recorded sessions repository database 135a, enabling auditors to have the capability to search for them.

One search method for auditing connects to the SC 115 via the TS 130, such as using workstation 148 in FIG. 1. However, auditing can also be performed as described above directly to the SC 115 from an auditor's workstation. Both methods are possible and configurable in the SC application to find essentially their exact time, and the auditors can receive a link opening the recorded video having the display window content and text representing the time the keys were pressed or a voice command was made.

Figure 3A:
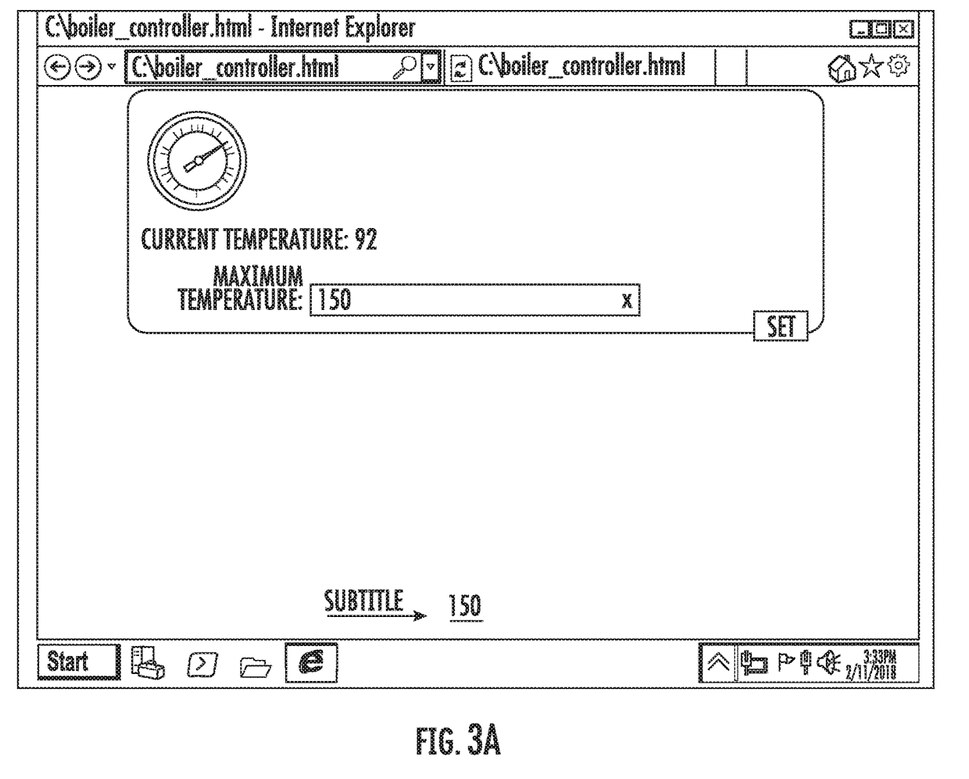
Figure 3B:
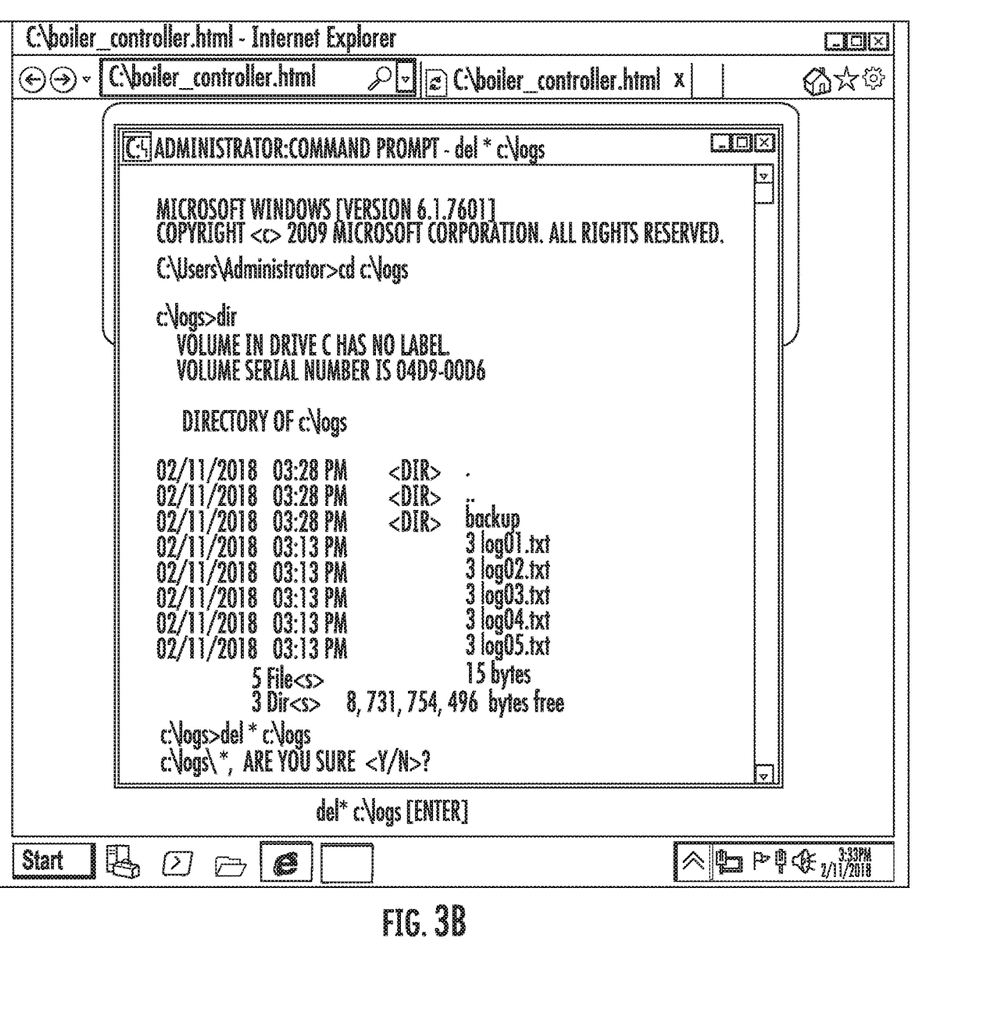
Figure 3C:
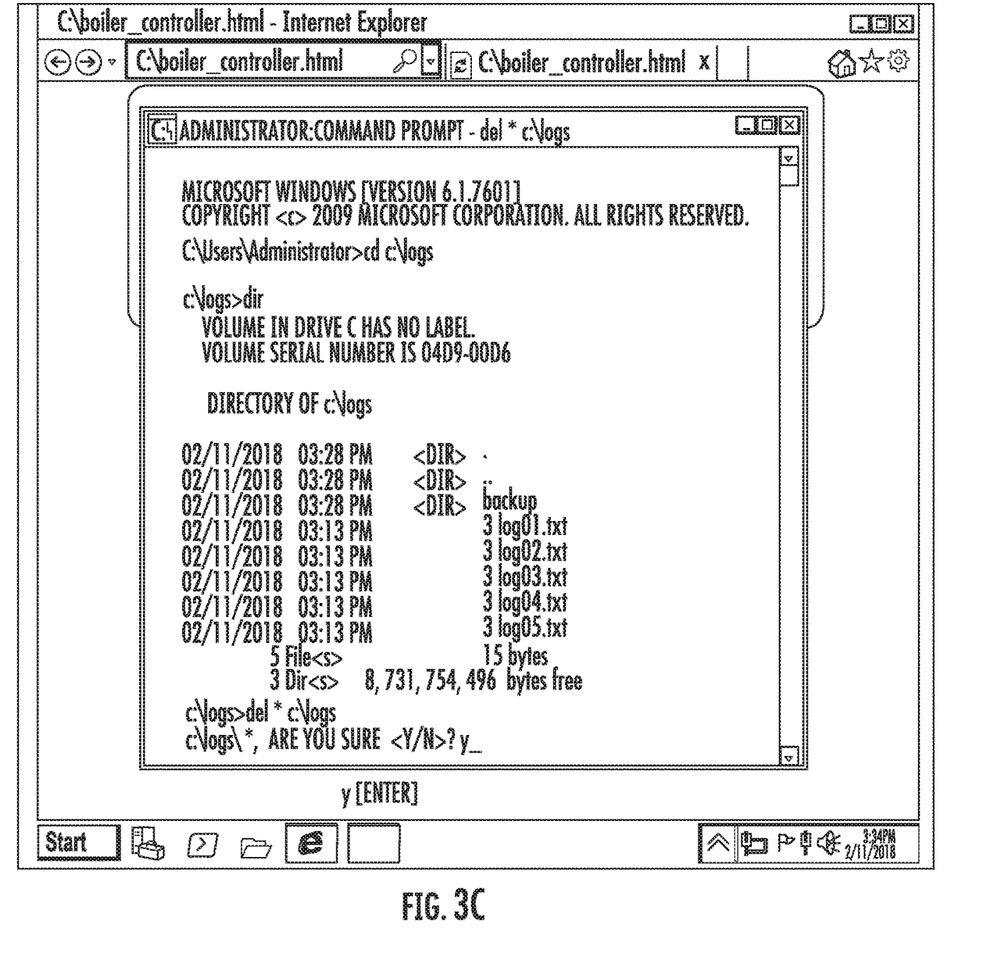

FIGS. 3A-C are screen capture snapshots of an engineer remotely working on a boiler device in an ICS, increasing the maximum temperature of a boiler, realizing that damage was done, and finally deleting the logs which can be later used to find the engineer responsible for the boiler damage. FIG. 3A shows the user typing in '150' shown as a subtitle, which in a later audit will serve as part of the evidence for the malicious act. FIG. 3B shows the user typing in a "del" (delete) command to delete the logs to try to remove the evidence. A later audit will reveal that the logs were missing, an auditor may then search the database for a "del" command to quickly find and then see this occurrence. FIG. 3C shows the constant keystroke recording for even the smallest commands entered, including pressing "y" for yes.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method of remote access action recording in a video file of a remote session, comprising:
   during said remote session directing said remote access actions of a user including a first action to be applied to a destination device located within at least one industrial control system (ICS) through a terminal server including a memory and a remote access recording component (RARC) and a security center that is coupled by a communication server through a network connection to said ICS, wherein said terminal server is coupled to a streaming server having a recorded session repository database, and wherein said terminal server limits said user to only specifically allowed said remote access actions and directing said first action if said specifically allowed that enables said user selecting said destination device from a menu that then provides a connection to said destination device for said first action to be begun;
   said RARC during each sampling interval of said remote session:
      recording streams of video of display window content as well as text representing said first action;
      combining said text and said display window content to generate a single combined video comprising output file, and
      storing said combined video comprising output file in said recorded session repository database.

2. The method of claim 1, wherein said remote access actions comprise keystrokes by said user entered on a workstation computer coupled to said terminal server.

3. The method of claim 1, wherein said remote access actions comprise voice commands.

4. The method of claim 1, wherein said network connection comprises an Internet connection, a virtual private network (VPN), or wide area network (WAN).

5. The method of claim 1, wherein said network connection comprises said Internet connection.

6. The method of claim 1, wherein said user comprises a contractor or engineer allowed by a manager of said ICS to perform work at said ICS.

7. The method of claim 1, wherein said destination device comprises a process controller, field device, or processing equipment, and wherein said first action comprises changing a setting of said process controller, field device, or changing a threshold value or a login permission.

8. The method of claim 1, wherein said RARC comprises firmware in said memory 130a.

9. The method of claim 1, wherein said text of said remote access actions are added as a caption in said display window content.

10. The method of claim 1, further comprising an auditor connected to said security center auditing said remote session comprising streaming said combined video comprising output files to identify malicious activity.

11. The method of claim 1, wherein said terminal server performs said limiting said user to only specifically allowed said remote access actions and directing said first action by accessing a website hosting said security center through which said user opens a browser to said Security Center to select said destination device.

12. A security management system for at least one industrial control system (ICS), comprising:
   a terminal server including a memory and a remote access recording component (RARC) coupled to a security center that is coupled by a communication server through a network connection to said ICS, wherein said terminal server is coupled to a streaming server having a recorded session repository database and wherein said terminal server is for limiting a user to only specifically allowed remote access actions and directing a first action if said specifically allowed that enables said user selecting a destination device in said ICS during a remote session from a menu that then provides a connection to said destination device for said first action to be begun;
   said RARC during each sampling interval of said remote session:
      recording streams of video of display window content as well as text representing said first action;
      combining said text and said display window content to generate a single combined video comprising output file, and
      storing said combined video comprising output file in said recorded session repository database.

13. The system of claim 12, wherein said remote access actions comprise keystrokes by said user entered on a workstation computer coupled to said terminal server.

14. The system of claim 12, wherein said wherein said network connection comprises an Internet connection, a virtual private network (VPN), or wide area network (WAN).

15. The system of claim 14, wherein said network connection comprises said Internet connection.

16. The system of claim 12, wherein said destination device comprises a process controller, field device, or processing equipment, and wherein said first action comprises changing a setting of said process controller, field device, or changing a threshold value or a login permission.

17. The system of claim 12, wherein said RARC comprises firmware in said memory.

18. The system of claim 12, wherein said text of said remote access actions are added as a caption in said display window content.

* * * * *